May 23, 1961

E. A. SCHONROCK 2,985,484

ROCKER TABLE SHEAVE BLOCK AND SPRING
HANGER ASSEMBLY FOR DUMP TRAILERS

Filed Sept. 14, 1953

Edwin A. Schonrock
INVENTOR.

BY

May 23, 1961 E. A. SCHONROCK 2,985,484
ROCKER TABLE SHEAVE BLOCK AND SPRING
HANGER ASSEMBLY FOR DUMP TRAILERS
Filed Sept. 14, 1953 3 Sheets-Sheet 2

Edwin A. Schonrock
INVENTOR.

May 23, 1961
E. A. SCHONROCK
2,985,484
ROCKER TABLE SHEAVE BLOCK AND SPRING
HANGER ASSEMBLY FOR DUMP TRAILERS
Filed Sept. 14, 1953
3 Sheets-Sheet 3
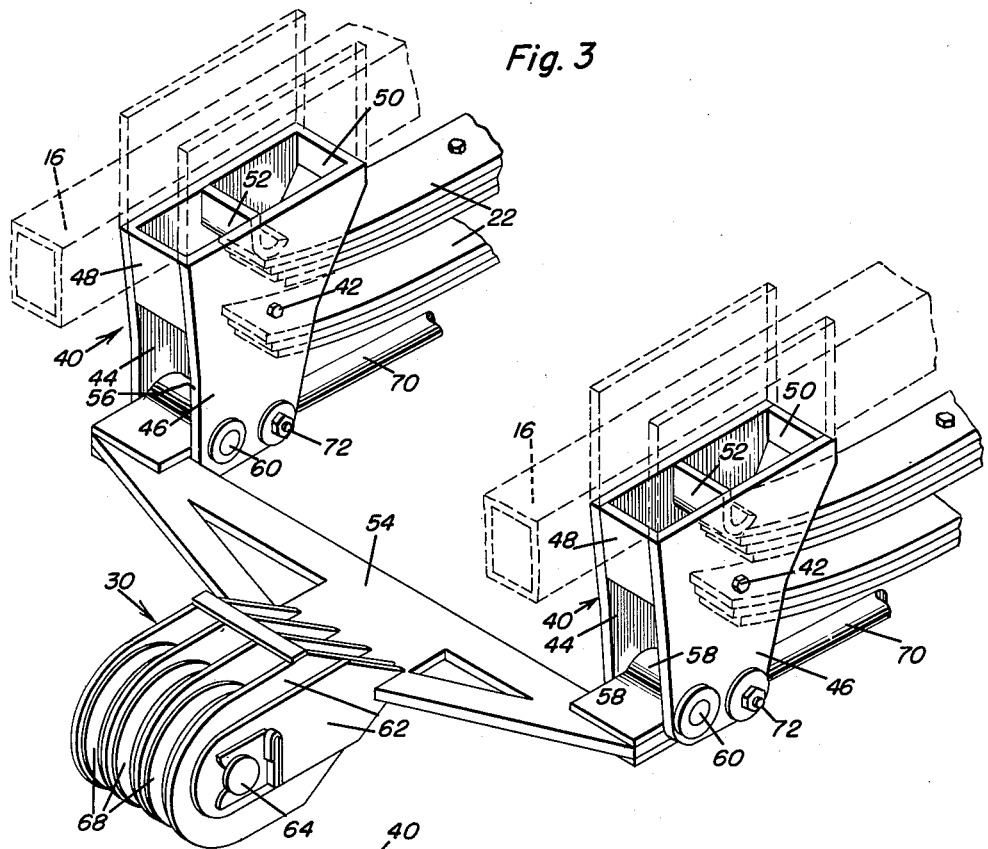
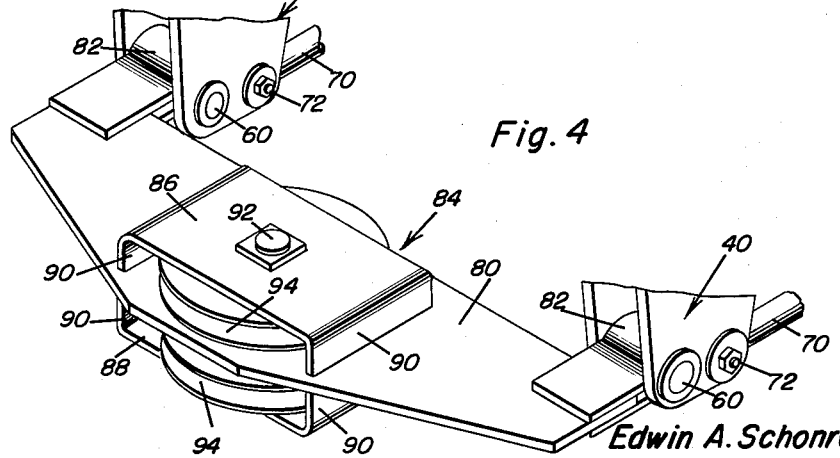
Edwin A. Schonrock
INVENTOR.

United States Patent Office 2,985,484
Patented May 23, 1961

2,985,484

ROCKER TABLE SHEAVE BLOCK AND SPRING HANGER ASSEMBLY FOR DUMP TRAILERS

Edwin A. Schonrock, San Angelo, Tex., assignor to Fruehauf Trailer Company, Detroit, Mich., a corporation of Michigan Filed Sept. 14, 1953, Ser. No. 379,877

11 Claims. (Cl. 298—20)

This invention comprises novel and useful improvements in a rocker table sheave block and spring hanger assembly for dump trailers and more specifically pertains to a combined spring hanger and a carriage pivotally connected thereto and carrying the sheave blocks of a cable dump trailer.

The present invention is directed chiefly to a cable dump trailer wherein a power operated means such as a pulley and cable system is operatively connected to a tractor unit and to a trailer whereby the wheel base of the trailer may be shortened by drawing the same towards the tractor unit causing the trailer to tilt upwardly by means of lift arms pivoted to the tractor unit and to the trailer, for raising and lowering the trailer.

A further object of the invention is to provide a unitary spring hanger which shall serve the joint functions of forming a seat for supporting one end of the rear axle springs of a dump trailer and shall further pivotally support a carriage upon which are mounted pulley sheaves of the cable tilting and lifting mechanism.

A further object of the invention is to provide an improved mounting for the pulley sheaves of a cable dump trailer which mounting shall be capable of vertical pivoting movement about a horizontal axis to facilitate a straightline pull of the cable assembly between the power source on the tractor unit and the attachment of the cable assembly to the dump trailer.

These together with other objects and advantages which will become subsequently apparent reside in the details of construction and operation as more fully hereinafter described and claimed, reference being had to the accompanying drawings froming a part hereof, wherein like numerals refer to like parts throughout, and in which:

Figure 3 is a perspective view showing the novel spring hanger and pulley sheave mounting assembly forming the subject matter of this invention, certain associated points of the frame of the trailer chassis and the rear axle spring assemblies being shown in dotted lines therein; and Figure 4 is a perspective view showing a modified form of pulley sheave which may be utilized with the spring hanger units.

The present invention relates to an improved spring hanger assembly and a rocker table or carriage having sheave blocks thereon and pivotally connected to the spring hanger assembly, which members are specifically adapted to improve the operation of the power operated mechanism for raising and lowering a cable dump trailer and for mounting the rear axle spring assembly thereon.

Figure 1:
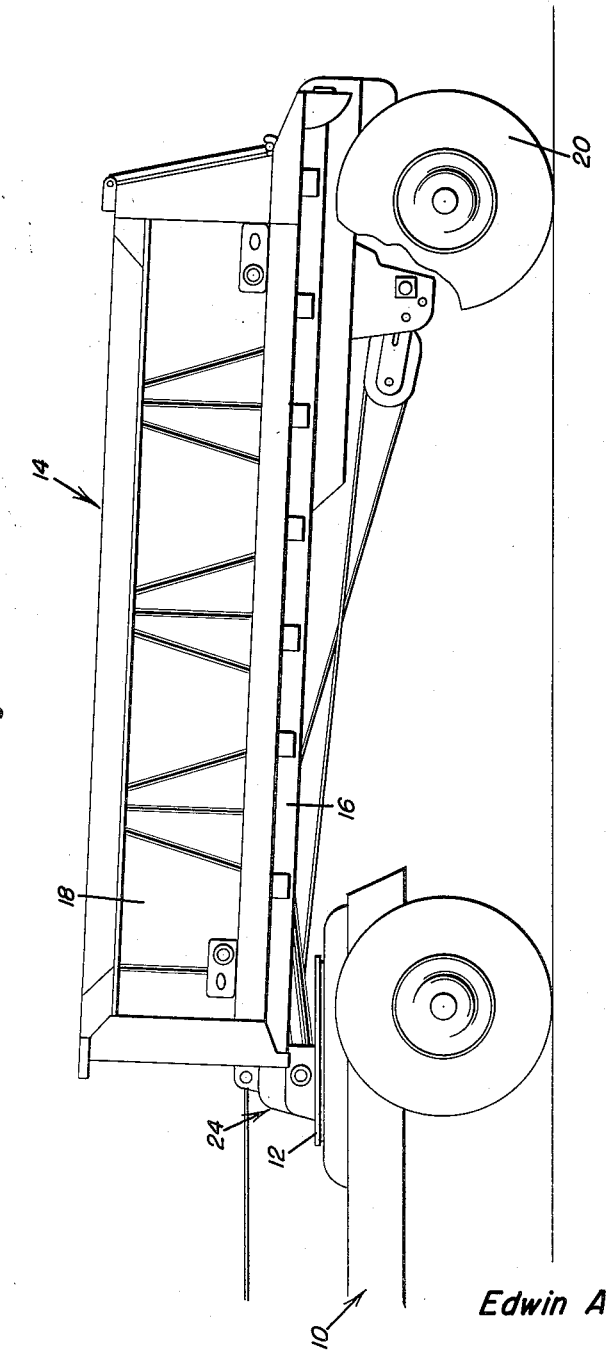
Figure 1 is a side elevational view showing the rear portion of a tractor unit having a cable dump trailer attached thereto in accordance with this invention, parts being broken away, the trailer being shown in its lowered or load carrying position.
Figure 2:
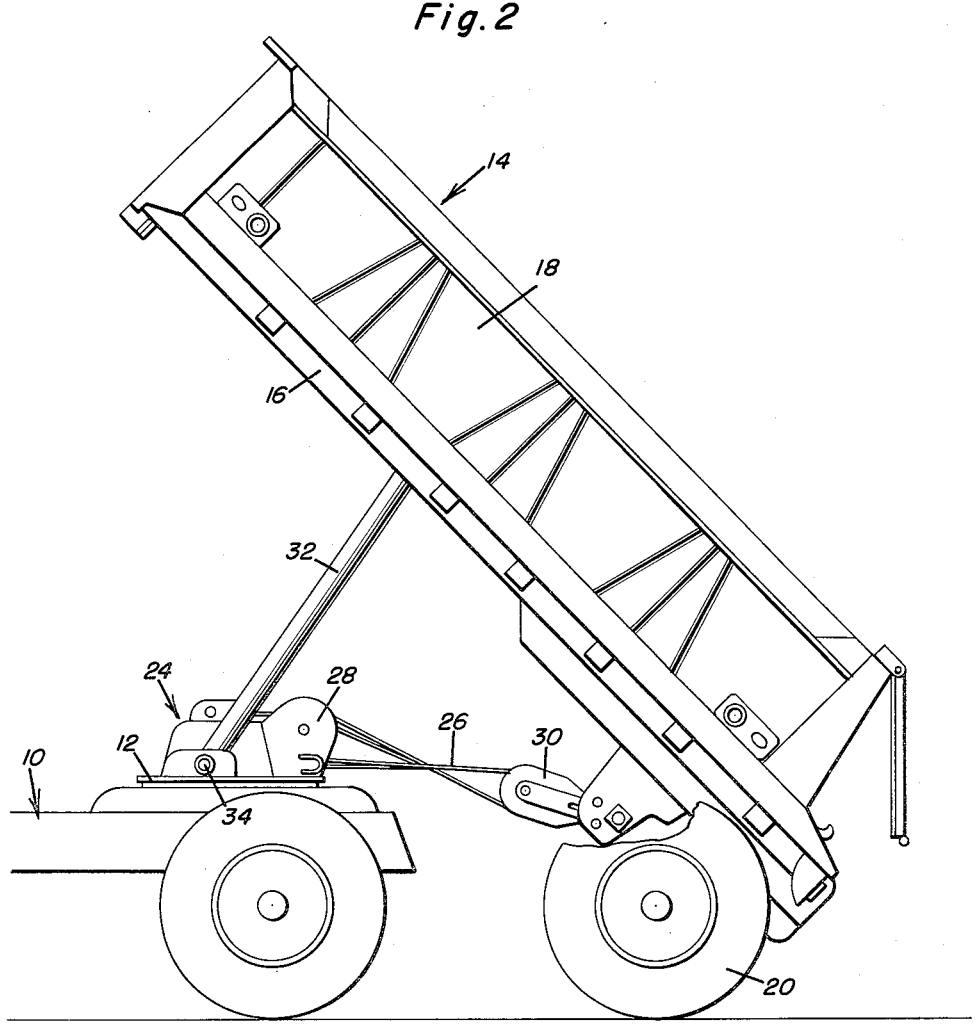
Figure 2 is a view similar to Figure 1 but showing the trailer with its wheel base shortened by the power operated means and the body of the trailer tilted into its dumping position.

Referring first to Figures 1 and 2, it will be seen that the numeral 10 designates generally the rear portion of a tractor unit which may be a conventional form of motor truck having a fifth wheel assembly 12 mounted thereon. A dump trailer 14, whose chassis has frame members 16 and a body 18, of any conventional design, is provided with a rear axle assembly 20, having the usual rear axle spring elements 22 secured to the rear axle, not shown. In a cable dump trailer of this type, there is provided a power operated winch, indicated generally by the numeral 24 and which may be of any desired construction, and which is mounted upon the fifth wheel assembly 12 for movement therewith. A cable assembly 26 is operatively connected with the power operated winch and a pulley sheave assembly 28 mounted upon the fifth wheel with a further pulley sheave assembly 30 which is operatively connected with the chassis of the dump trailer by the means forming the subject of this invention and as set forth hereinafter. There are also provided in this type of dump trailer, a pair of lift arms 32, which are pivoted to the fifth wheel assembly 12 by pivot pins 34, at opposite sides of the fifth wheel assembly, at the lower end of the arms, and each of which is pivoted at the upper end of the arms to the chassis of the dump trailer in any desired manner.

In this form of dump trailer, which is a conventional and recognized type of dump trailer insofar as the present invention is concerned, the trailer is lowered, as shown in Figure 1, with the lift arms extending rearwardly from the fifth wheel assembly and with the front end of the body 18 resting upon the lift arms. This is the normal transporting or load carrying position of the trailer and it will be seen that the wheel base of the trailer, in its lowered position, is fixed.

In a cable dump trailer of this type, when it is desired to dump the trailer, the power operated winch 24 is energized, and through the cable 26 which is trained over the sheave pulley assemblies 28 and 30, the rear axle assembly of the trailer is drawn forwardly toward the tractor unit, thereby shortening the wheel base of the dump trailer, as shown in Figure 2. Due to the pivotal connection of the lift arms with the fifth wheel assembly and the trailer body, an upward tilting or swinging movement is imparted to the latter thus elevating the same into the dumping position, as shown in Figure 2.

The object of the present invention is to provide an improved means for operatively connecting the cable 26 and the pulley sheave assembly 30 to the dump trailer chassis frame, whereby to improve the effectiveness of the operation of the cable tilting means; and to provide an improved mounting for the spring elements 20 of the rear axle assembly.

Attention is now directed to Figure 3 for a better understanding of the construction of this mounting and connecting means. A pair of spring hangers, each indicated generally by the numeral 40, is rigidly mounted upon and secured to the chassis of the dump trailer as to the frame members 16, as for example, by means of a welded joint. The actual manner by which the spring hanger assemblies 40 are attached to the trailer are immaterial to the principles of this invention, although the means illustrated and the positioning of the spring hanger assemblies, as shown in the drawings, has been found to be entirely satisfactory in operation. Each of the spring hanger units 40 is preferably of a unitary construction, as for example, comprising a unitary casting of suitable material. It is, however, also possible to form the same from a series of plates and elements rigidly attached together in any suitable manner, as by welding or the like. In any event, it is preferred that these spring hanger assemblies shall include parallel vertical plates 44 and 46, which are connected together at their upper ends by transverse reinforcing webs 48 and 50. Suitable seats are provided within each of the spring hanger assemblies 40, extending transversely between the plates 44 and 46, as for example, the transversely disposed seats 52 against which are seated the ends of the rear spring members 22 of the axle spring assembly. Bolts 42 extending transversely between the plates 44, 46, restrain the lower spring sections. The weight of the dump trailer is thus applied through the spring hanger assemblies 40 to the ends of the spring members 22, which in turn are secured to the axle in any suitable manner and at their rearmost ends are secured to the chassis of a dump trailer, in any conventional way. In addition to their functioning as hangers for the rear axle springs, the assemblies 40 also serve as a support for the pulley sheave assembly 30.

For this latter purpose, there is provided a carriage 54 which constitutes a rocker table for supporting the pulley sheave assembly 30. This carriage is preferably in the form of a plate-like member which extends transversely between the two spring hanger assemblies 40 and is pivotally connected thereto. This pivotal connection is obtained by providing oppositely disposed bearing members 56 and 58, extending from and rigidly connected to the ends of the carriage 54, and between the plates 44 and 46 of the spring hanger assemblies. Suitable horizontally disposed and transversely aligned pivot pins 60 extend through the bearing members 56 and 58 to thus provide hinge pins about which the carriage 54 is adapted to vertically pivot upon a horizontal axis which is parallel to the rear axle.

Intermediate its ends and upon the forward edge of the same, the carriage 54 is provided with a plurality of forwardly extending parallel lugs or plates 62 constituting sheave blocks and carrying a pulley axle 64 therebetween having pulleys 68 journaled thereon. These pulleys form part of the pulley and cable assembly of the power operated means whereby the tilting operation of the dump trailer is effected. The sheaves may be integrally formed with the carriage 54, or may be separately or rigidly connected therewith as by welding or the like.

The construction of the carriage or rocker table assembly having the rigidly or integrally mounted sheave block assembly 30 thereon greatly simplifies the mounting of the cable pulleys in operative relation with the chassis of the dump trailer, by providing a single element which carries the pulley sheaves and also is attached to the chassis of the dump trailer through the spring hanger assemblies. It will also be noted that during operation, the pulley sheave assembly 30 is free to pivot vertically in order to maintain a straight line of pull between the fixed sheave assembly 28 as the wheel base of the trailer is shortened or increased during the tilting or lowering of the dump trailer.

In addition, the spring hanger assemblies are utilized for the dual functions of supporting the rear axle assembly springs and or pivotally mounting the rocker table or carriage of the pulley sheave assembly 30; and in addition, constitutes a mounting for the customary rear axle assembly torque rods 70, by means of the pivotal connections 72, the torque rod construction being of conventional design and requiring no illustration in these drawings.

In the carriage and pulley sheave assembly of Figure 3, it will be observed that the pulleys 68 rotate about a horizontal pulley axle 64. It is possible however, and in some instances may be preferable to mount the pulleys for rotation about a vertical axis. For this purpose, the modified form of carriage or rocker table, shown in Figure 4, is employed. This modified carriage consists of a plate-like member 80 which, at its ends is provided with rearwardly extending bearing members 82 and corresponding to the bearing members 56 and 58 of Figure 3. These bearing members are secured in the same manner as those of Figure 3, to the spring hanger assemblies 40 by the pivot pins 60, in a manner previously described, whereby the carriage will have a vertical pivoting movement about the horizontal axis of the aligned pivot pins 60. Intermediate its ends, the carriage has a pulley sheave assembly, indicated generally by the numeral 84, either rigidly or integrally mounted thereon. This pulley sheave assembly includes plates 86 and 88, respectively, disposed above and below or on opposite sides of the carriage 80, and being spaced therefrom by inwardly turned flanges 90, at their opposite ends and which flanges abut against and are either rigidly or integrally attached to the carriage 80. A vertical pulley axle 92 is secured to and extends between the plate 86, 88, and the central portion of the carriage 80 and rotatably receives the pair of pulleys 94. It will thus be apparent that this form of the rocker table or carriage member that the pulley sheaves are so arranged that the pulleys rotate about a common vertical axle.

As in the preceding form, the spring hanger assemblies, the torque arms 70, of the rear axle assembly pivotally connected thereto, as by the pivot means 72.

It should be especially noted that in both of the embodiments of Figures 3 and 4, there has been provided an improved connecting means whereby conventional trailers may readily be converted to the cable dump-type of trailer by merely altering the structure of the trailer through the attachment of the spring hanger assemblies and the carriage or rocker table members and the attachment of the lift arms 32 to a tractor unit which has its fifth wheel assembly modified to accommodate the lift arms and the power operating means of the cable assembly.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a dump trailer of the type having a trailer chassis with a rear axle assembly including a pair of load supporting springs each secured at its midportion to said assembly, lift means pivotally connected to a tractor unit, power operated means connected to said chassis and trailer for moving the trailer relative to the former whereby said lift means will tiltingly raise and lower the chassis about said rear axle assembly upon relative movement of the tractor and trailer; a pair of spring hangers mounted on said chassis, said pair of springs being each engaged at one end thereof to one of said hangers, a torsion rod pivoted to a hanger and secured to said assembly, a carriage pivoted to both of said hangers for vertical tilting about an axis extending transversely of said hangers and chassis, said power operated means being connected to said carriage whereby the stress created by said power operated means acting upon said carriage will both be directly applied to tilt the carriage into the line of stress and will be directly applied to the carriage and by the latter to the hangers and from thence partly to said chassis and the remainder of said stress to said axle assembly through said torsion rod.

2. The combination of claim 1 wherein said power operated means includes a cable and pulley assembly operatively connected to the tractor and trailer, the connection to the trailer including pulleys journaled upon said carriage.

3. The combination of claim 1 wherein said carriage includes portions each extending into one of said hangers, pivot means operatively connecting each said portion to its associated hanger for relative pivotal movement.

4. The combination of claim 1 wherein said carriage comprises a flat, plate-like member extending transversely across said hangers and having at its opposite ends portions extending into and pivoted to said hangers.

5. The combination of claim 4 wherein said power operated means is connected to said plate-like member intermediate the ends of the latter.

6. The combination of claim 1 wherein said power operated means includes a cable and pulley assembly operatively connected to the tractor and trailer, the connection to the trailer including pulleys journaled upon said carriage, said pulleys being journaled upon said carriage intermediate the ends of the latter.

7. The combination of claim 1 wherein each of said hangers comprises spaced side walls and has a recess therebetween opening at the ends of the side walls, one open end of said recess having an end of a spring disposed therein and the other open end of said recess receiving and pivotally supporting a portion of said carriage.

8. The combination of claim 1 wherein each of said hangers comprises spaced side walls and has a recess therebetween opening at the ends of the side walls, one open end of said recess having an end of a spring disposed therein and the other open end of said recess receiving and pivotally supporting a portion of said carriage, said torsion rod extending into and having its pivotal connection in the recess.

9. In a dump trailer of the type having a trailer chassis with a rear axle assembly including a pair of load supporting springs each secured at its midportion to an axle of said assembly, lift means pivotally connected to a tractor unit, power operated means connected to said chassis for moving the trailer relative to the former whereby said lift means will tiltingly raise and lower the chassis about said rear axle assembly upon relative movement of the tractor and trailer; a pair of spring hangers mounted on said chassis, said pair of springs being each engaged at one end thereof to one of said hangers, a carriage pivoted to both of said hangers for vertical tilting about an axis extending transversely of said hangers and chassis, said power operated means being connected to said carriage whereby the stress created by said power operated means acting upon said carriage will both be directly applied to tilt the carriage into the line of stress and will be directly applied to the carriage and by the latter to the hangers and from thence to said chassis, said carriage extending transversely across said hangers and having at its opposite ends portions extending into and pivoted to said hangers.

10. The combination of claim 9 wherein said hangers include each a pair of spaced side walls defining a recess therebetween open at both ends of said side walls, one open end of said recess receiving the end of a spring and the other open end thereof receiving said portion.

11. The combination of claim 10 wherein each hanger includes a support element in said recess extending between said side walls, said end of said spring underlying and supporting said support element.

References Cited in the file of this patent

UNITED STATES PATENTS

| | | |
|---|---|---|
| 2,496,350 | Lundell | Feb. 7, 1950 |
| 2,517,933 | Schonrock | Aug. 8, 1950 |
| 2,542,795 | Clement et al. | Feb. 20, 1951 |
| 2,605,134 | Clement et al. | July 29, 1952 |
| 2,637,593 | Schonrock | May 5, 1953 |
| 2,661,236 | Schonrock | Dec. 1, 1953 |
| 2,679,433 | Wasinger | May 25, 1954 |